Dec. 23, 1930.  A. HIGHTOWER  1,786,240
COTTON PACKER
Filed Aug. 3, 1929

Arthur Hightower,
INVENTOR

BY John M. Spellman
ATTORNEY

Patented Dec. 23, 1930

1,786,240

UNITED STATES PATENT OFFICE

ARTHUR HIGHTOWER, OF FROST, TEXAS

COTTON PACKER

Application filed August 3, 1929. Serial No. 383,288.

This invention relates to improvements in agricultural implements, particularly for cotton and the primary object thereof is to provide a packer for packing the soil around young growing cotton plants to prevent escape of moisture from the soil.

The invention aims to provide a simple construction designed to bring about the above results and which is adapted to attachment to an ordinary cultivator and drawn over the young cotton plants. The attachment embodying the invention is of such shape and weight as to prevent injury to the crop and at the same time repacks the soil disturbed by the preceding cultivator shovels.

Figure 1:
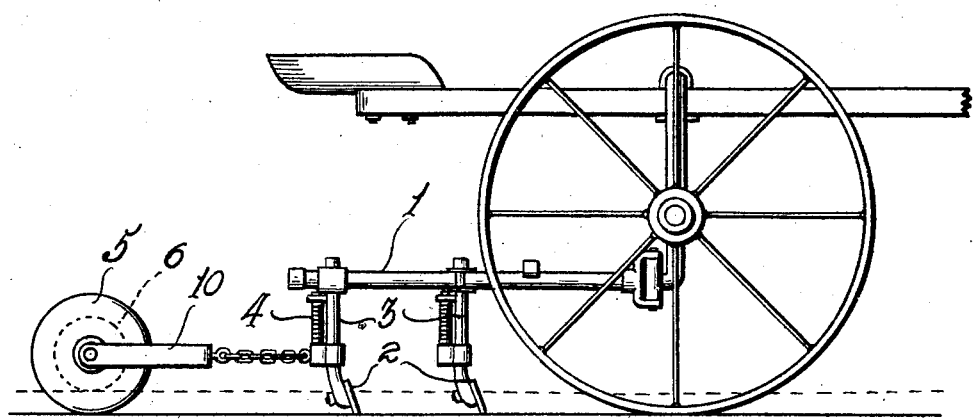
Figure 2:
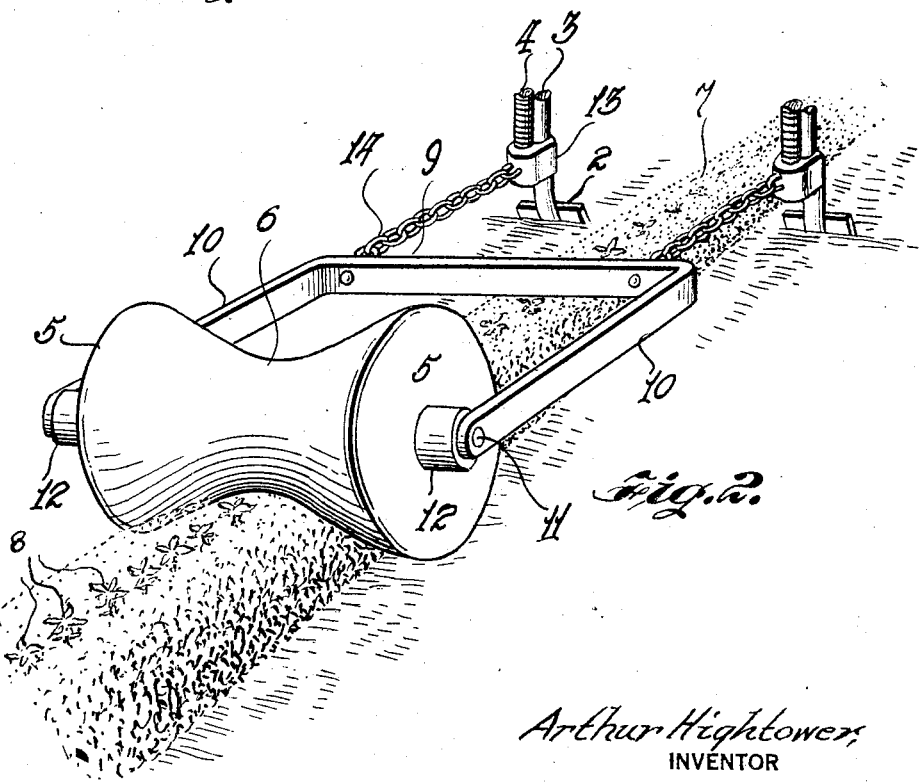

The invention will be better understood from a perusal of the following detailed description, taken in connection with the accompanying drawings and wherein:

Figure 1 is a side elevational view of an ordinary cultivator and illustrating the invention attached thereto, and Figure 2 is an enlarged perspective view of the invention in operative position attached to the legs of a cultivator, the latter being partly broken away.

Referring more in detail to the drawings, 1 denotes a cultivator beam carrying shovels 2 secured to the legs 3 supporting the shovels. Each shovel includes the usual springs 4.

The invention consists of a roller constructed of any preferred material such as concrete, wood or metal to provide sufficient weight. The roller or packer element is of the same diameter at the ends 5 and tapers to the center. This reduces the diameter at the central point 6, enabling the roller to more easily follow the hill 7 formed by the soil in which the cotton plants 8 are growing, and simultaneously riding over the plants.

The roller includes a frame 9 which is pivoted by the arms 10 to a shaft 11. The shaft 11 is by preference rigidly seated in and traverses the center of the roller. The arms 10 at the point of connection to the shaft 11 are spaced from the ends 5 of the roller to eliminate friction between the arms and roller and to prevent jamming and collection of weeds and soil. The arms 10 are held in this position by the hubs 12.

The frame is connected to the cultivator rods and spring supporting heel or member 13 by chains or the like 14.

In operation the roller or packer is drawn over the center of a row of growing cotton plants. By this is meant of course young plants which have just ascended a short distance from the soil. Cotton plants being sturdy and strong, when the roller passes over them the plants will spring back to erect standing position and remain uninjured. The soil, however, forming the row 7 will be repacked or pressed down after the shovels 2 have uprooted the weeds.

The roller and its frame and parts are capable of modification in keeping with the appended claim as the invention is not to be understood as restricted to the precise construction shown.

What is claimed as new is:

In combination with a cotton cultivator or the like having earth working implements arranged in groups adapted to engage the soil on opposite sides of a row of cotton, and a roller for repacking the loose earth after the passage of said earth working implements, said roller being of reduced diameter adjacent its center and tapering inwardly from adjacent its ends, and flexible chain members connecting each side of the roller to one of the earth working elements on the same side of the cotton row, whereby the roller will follow in the wake of the cultivator and conform to the crown of a row of soil containing cotton plants.

In testimony whereof I affix my signature.

ARTHUR HIGHTOWER.